United States Patent
Peterman

(10) Patent No.: US 12,442,439 B2
(45) Date of Patent: *Oct. 14, 2025

(54) VEHICLE SYSTEM

(71) Applicant: Polaris Industries Inc., Medina, MN (US)

(72) Inventor: Jeffrey I. Peterman, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,174

(22) Filed: Jan. 11, 2024

(65) Prior Publication Data

US 2024/0151301 A1    May 9, 2024

Related U.S. Application Data

(63) Continuation of application No. 17/683,519, filed on Mar. 1, 2022, now Pat. No. 11,892,067.

(60) Provisional application No. 63/157,254, filed on Mar. 5, 2021.

(51) Int. Cl.
| | |
|---|---|
| *F16H 48/24* | (2006.01) |
| *F16H 48/08* | (2006.01) |
| *F16H 48/28* | (2012.01) |

(52) U.S. Cl.
CPC ............. *F16H 48/24* (2013.01); *F16H 48/08* (2013.01); *F16H 48/28* (2013.01); *F16H 2048/087* (2013.01)

(58) Field of Classification Search
CPC ...................... F16H 48/24; F16H 48/28; F16H 48/08–2048/087
See application file for complete search history.

(56) References Cited

U.S. PATENT DOCUMENTS

| | | | |
|---|---|---|---|
| 3,930,424 A | 1/1976 | Myers, Sr. | |
| 3,977,503 A | 8/1976 | Hurst | |
| 4,838,120 A * | 6/1989 | Okada | F16H 48/16 192/105 B |
| 5,055,095 A | 10/1991 | Osenbaugh et al. | |
| 5,183,446 A * | 2/1993 | Hughes | F16H 48/08 475/236 |
| 5,897,452 A | 4/1999 | Schreier et al. | |
| 6,015,362 A | 1/2000 | Irikura et al. | |
| 8,308,601 B2 | 11/2012 | Ishikawa et al. | |

(Continued)

FOREIGN PATENT DOCUMENTS

| | | |
|---|---|---|
| EP | 1895196 A2 | 3/2008 |
| FR | 3007484 A3 | 12/2014 |

(Continued)

OTHER PUBLICATIONS

International Preliminary Report on Patentability with Written Opinion of International Searching Authority, corresponding to PCT/US2022/018688, Date of Mailing: Sep. 14, 2023.*

(Continued)

*Primary Examiner* — James J Taylor, II

(74) *Attorney, Agent, or Firm* — Merchant & Gould P.C.

(57) ABSTRACT

A mechanical differential assembly for a wheeled vehicle including a housing a pinion gear operable to both rotate relative to an interior surface of the housing and be fixed relative to the interior surface of the housing and a clutch portion fixed to the pinion gear.

20 Claims, 16 Drawing Sheets

(56) References Cited

U.S. PATENT DOCUMENTS 10,801,597 B2   10/2020  Inose
11,835,122 B2 * 12/2023  Numabe ................. F16H 48/08

FOREIGN PATENT DOCUMENTS

JP      2002349599 A    12/2002
WO      2016083686 A1   6/2016

OTHER PUBLICATIONS

International Search Report and Written Opinion regarding International Application No. PCT/US2022/018688, mailed May 13, 2022.

* cited by examiner

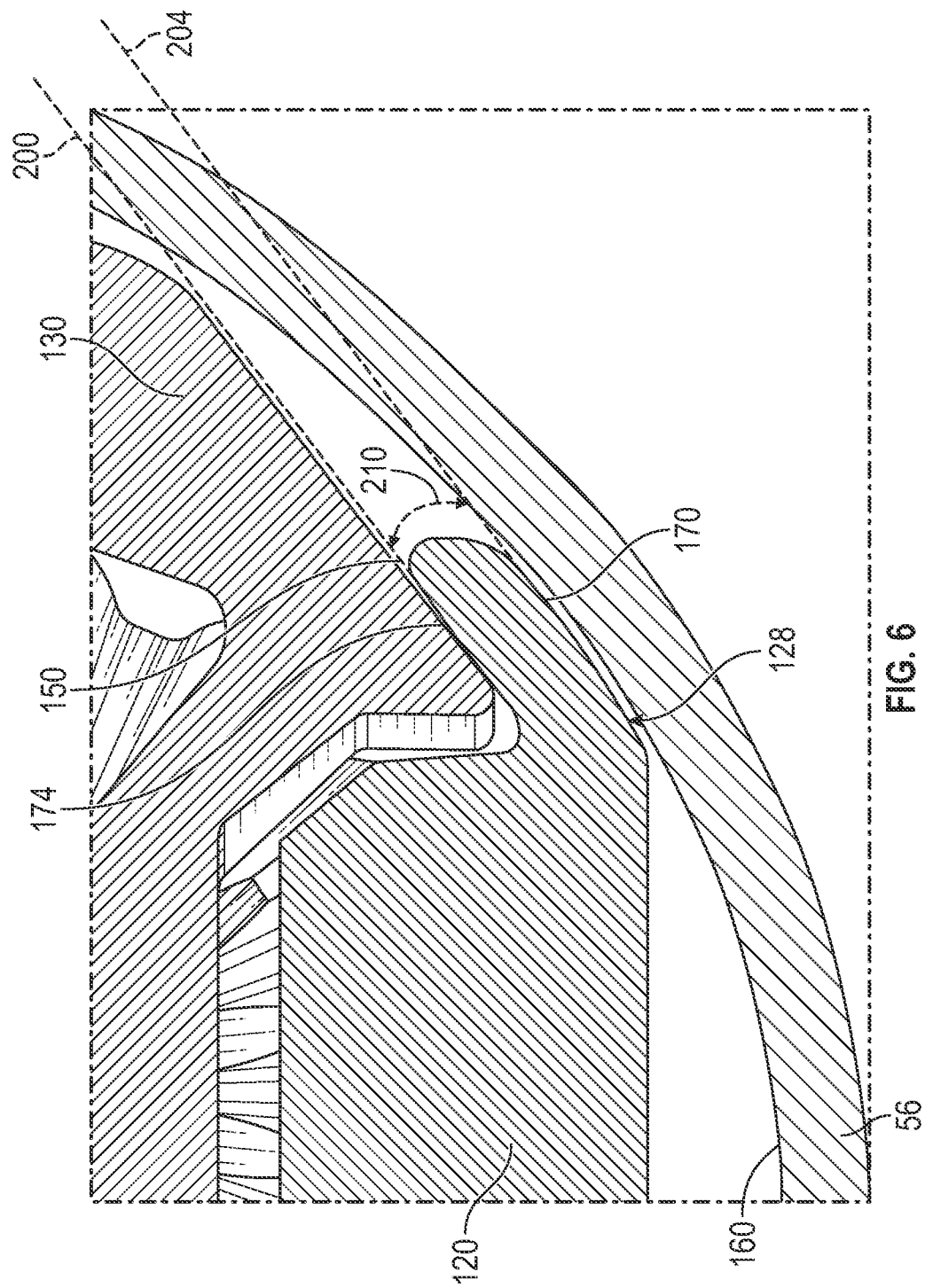

VEHICLE SYSTEM

CROSS-REFERENCE TO RELATED APPLICATIONS

This application is a Continuation of U.S. application Ser. No. 17/683,519, filed on Mar. 1, 2022, which claims priority to U.S. Provisional Application No. 63/157,254, filed on Mar. 5, 2021. The entire disclosures of each of the above applications are incorporated herein by reference.

FIELD

The present disclosure relates to a drivetrain system, and more particularly, to a differential assembly for a vehicle.

BACKGROUND

This section provides background information related to the present disclosure which is not necessarily prior art.

A vehicle may be used to traverse a selected area. The vehicle may include various drive or control systems such as a power plant which may include a gas powered engine or electric powered motor, and various control systems therefore. The vehicle may include a transmission and a steering control system, in various embodiments. Further the vehicle may include a selected number of wheels or tracks, such as a four-wheeled vehicle. The wheels are powered by the power plant to move the vehicle.

The vehicle may further include additional systems that are connected to and/or controlled by portions of the vehicle. Various control panels or mechanisms may be included to allow access or control of the systems by the user with the vehicle. The vehicle, for example, may include a powered winch to assist in various activities performed with a vehicle.

SUMMARY

This section provides a general summary of the disclosure, and is not a comprehensive disclosure of its full scope or all of its features.

A vehicle may have a selected power plant that provides power to ground engaging members, such as wheels. In various embodiments, a vehicle may include two or more wheels. For example, a four wheel vehicle may include two pairs of wheels, often referred to as forward and rearward wheels. The power plant may power the wheels through a drive shaft and a differential assembly. The power plant may be an internal combustion engine, an electrical motor, combinations of both, or other appropriate power plant system. Accordingly, reference herein to any one type of power plant, e.g., an engine, will be understood to not be exclusive to that type of power plant unless specifically stated.

The differential assembly may redirect power from the drive shaft to a plurality of wheels, such as two wheels. The differential may allow for an application of power to the wheels at differing speeds. The differential, therefore, may allow for efficient and smooth handling of the vehicle during travel, such as cornering. The differential, therefore, may assist in providing more power to a wheel that is spinning faster.

The differential may also be locked to provide an equal amount of torque or power to both wheels even in certain situations. For example, the vehicle may be in a situation where one of the wheels being driven by the engine has very low traction relative to the other wheel. Accordingly, providing power to the low traction wheel will not allow or increase movement of the vehicle. Locking the differential may provide a mechanism to provide power to both of the wheels such that power may be provided to the high traction wheel as well.

In a locking differential situation, a member may be provided to engage a differential casing and a selected gear, referred to herein as a spider gear or pinion gear, to allow a provision of power to a high traction wheel when a low traction wheel is also present. The power, therefore, may also be provided to assist in moving a vehicle from a low traction situation. The locking differential may disengage or unlock when the difference in traction no longer exists. Therefore, the differential may provide a selective locking or provision of power based upon a traction situation relative to different wheels of the vehicle.

According to various embodiments, a mechanical differential assembly for a wheeled vehicle is disclosed including a housing having an interior surface. The mechanical differential assembly further includes a pinion gear operable to both rotate relative to the interior surface of the housing and be fixed relative to the interior surface of the housing and a clutch portion fixed to the pinion gear. Further, the mechanical differential assembly includes a locking member configured to engage the clutch portion and lock the pinion gear to the housing when the mechanical differential assembly is in a locked configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a detailed cross-sectional view taken along line 6-6 of FIG. 2;

Corresponding reference numerals indicate corresponding parts throughout the several views of the drawings.

DETAILED DESCRIPTION

Example embodiments will now be described more fully with reference to the accompanying drawings.

Figure 1:
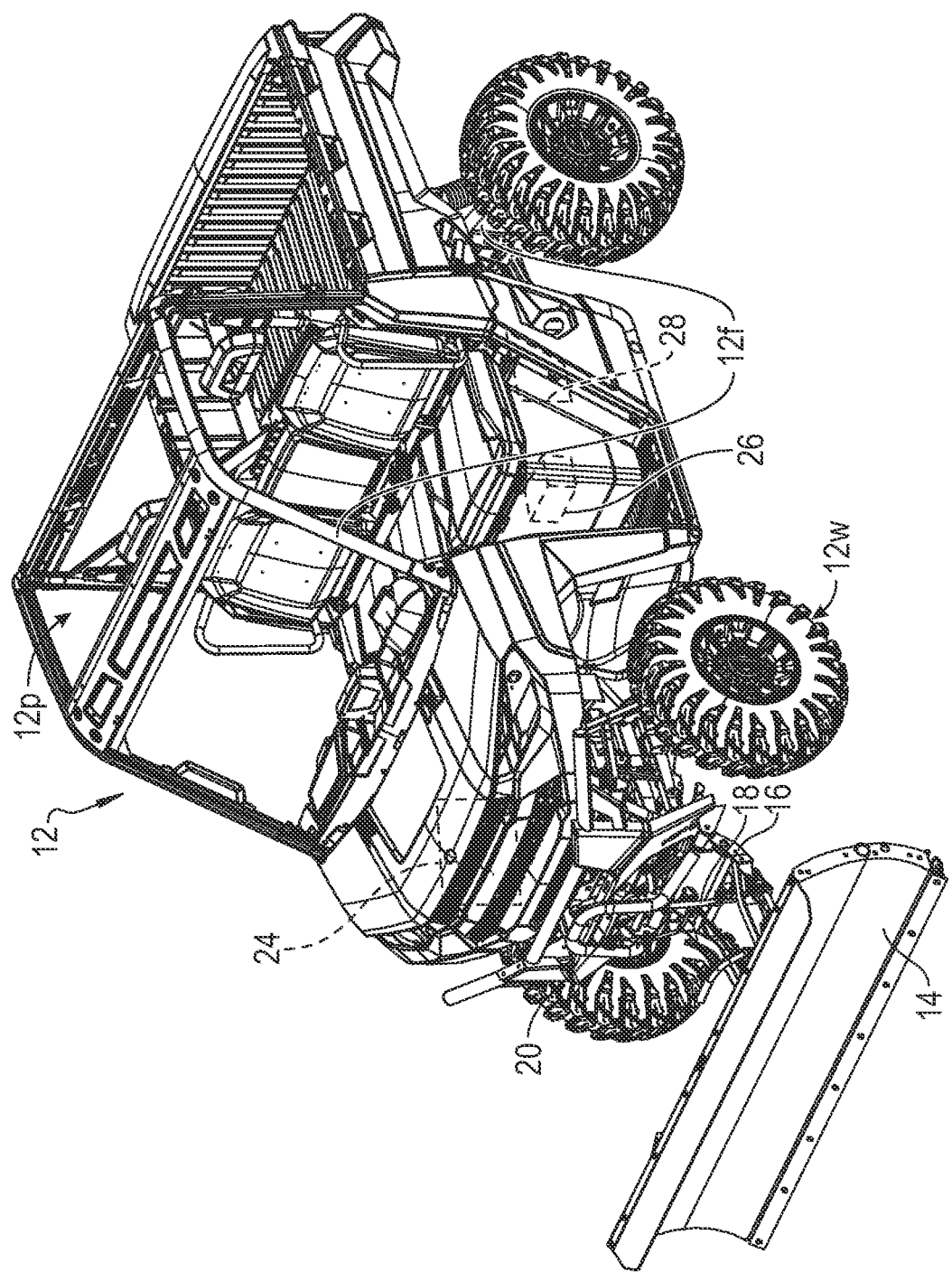
FIG. 1 is an environmental view of a vehicle, according to various embodiments.

FIG. 1 illustrates an off-road/utility vehicle 12. The vehicle 12, however, is merely exemplary and may include any appropriate type of vehicle, such as an on-road, off-road, utility, or appropriate vehicle. In various embodiments, the off-road vehicle 12 and may include a Polaris Ranger® and/or a Polaris Sportsman® vehicle, each offered by Polaris Industries of Medina, Minnesota, that may also be referred to as a side-by-side vehicle, all-terrain-vehicle (ATV), etc. The vehicle 12 may include various systems, such as a plow 14 that may be moveably attached to the vehicle 12 by way of support arms 16. A winch system 20 may also be provided having a line 18, also referred to as a cable or rope.

The vehicle 12 may include various components, such as those understood by one skilled in the art. For example, the vehicle 12 may include ground or surface engaging portions, such as one or more wheels 12*w*. The wheels 12*w* may be rotatably connected to the vehicle 12 and or portions thereof, such as a vehicle frame or supports 12*f*. The vehicle 12 may further include a passenger or user compartment 12*p* and an auxiliary or cargo area 12*c*. The compartments may be carried on or connected to the frame 12*f*. The vehicle 12 may further be powered by a power plant 24. Herein, the power plant may be referred to as a motor 24 (e.g., electric motor) and/or an engine 24 (e.g., an internal combustion engine such as a gasoline fueled engine). Various components may further include an alternator or generator to generate electrical power and an energy storage system, such as a battery 26. Further, a fuel tank 28 may also be provided.

Figure 2:
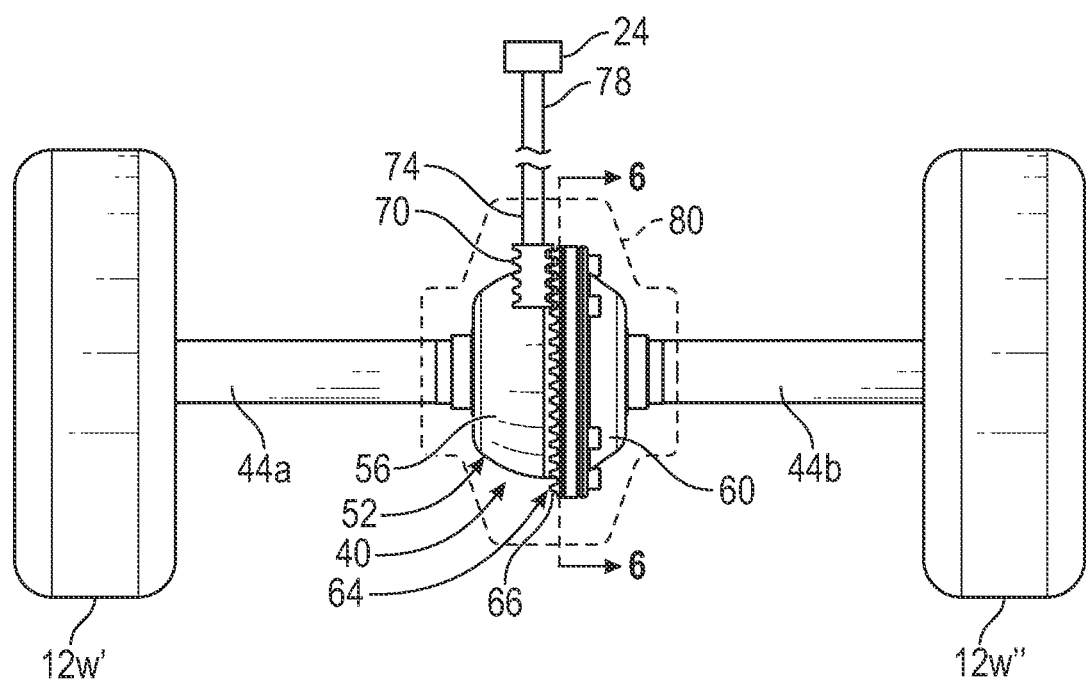
FIG. 2 is a detailed schematic view of a wheel axle and differential assembly of the vehicle.

With continuing reference to FIG. 1 and additional reference to FIG. 2, a differential assembly 40 is illustrated relative to schematic left and right axles 44*a*, 44*b* and two respective wheels 12*w'* and 12*w'''*. As discussed further herein, the axles 44*a*, 44*b* may also be referred to as stub axle portions. The axles 44*a*-44*b* may engage or be engaged or connected to axle shaft or axle end or side gears (FIGS. 3A and 3B) 48*a*, 48*b* of the differential assembly 40. The differential assembly 40 may include various components, such as a housing assembly or carrier 52 including a first or bell housing 56 and a second or flatter housing portion 60. The two housing portions 56, 60 may be formed as separate members that are assembled to form the housing 52. Further, the two housing portion may be the same or different. For example, the first housing portion 56 may be a rounded or bell shape and the second member 60 may be flatter or shallower shape. The housing assembly 52, however, may be formed in any appropriate configuration as discussed further herein.

The housing portion 52, such as the bell portion 56 thereof, may include or define a ring gear assembly 64. The ring gear 64 may be engaged to the housing 52 in any appropriate manner, such as being formed or forged therewith, mounted or fixed thereto, or any appropriate manner. Generally, the ring gear 64 may include a plurality of teeth. The teeth 66 of the ring gear 64 may be engaged to a pinion gear or engaged by a pinion gear 70. The pinion gear 70 may be connected to a pinion shaft 74 that may be connected to or extend directly from a drive shaft 78. The drive shaft 78 may be driven by the engine 24, as is generally understood by one skilled in the art. The differential assembly 40 may be included within a housing, such as an axle housing 80. The axle housing 80 may include portions that house various portions of the axles 44*a*, 44*b* and/or portions of the differential assembly 40.

Accordingly, the differential assembly 40 may be interconnected with the drive shaft 78 to provide a selected amount of power to the axles 44*a*, 44*b* via the differential assembly 40. The power from the axles 44*a*, 44*b* may be transferred to the wheels 12*w'*, 12*w'''*. As discussed further herein, the differential 40 may operate to allow for varying speeds of the two wheels 12*w'*, 12*w'''* and/or transfer a selected amount of torque to a high traction wheel relative to a low traction wheel.

Figure 3A:
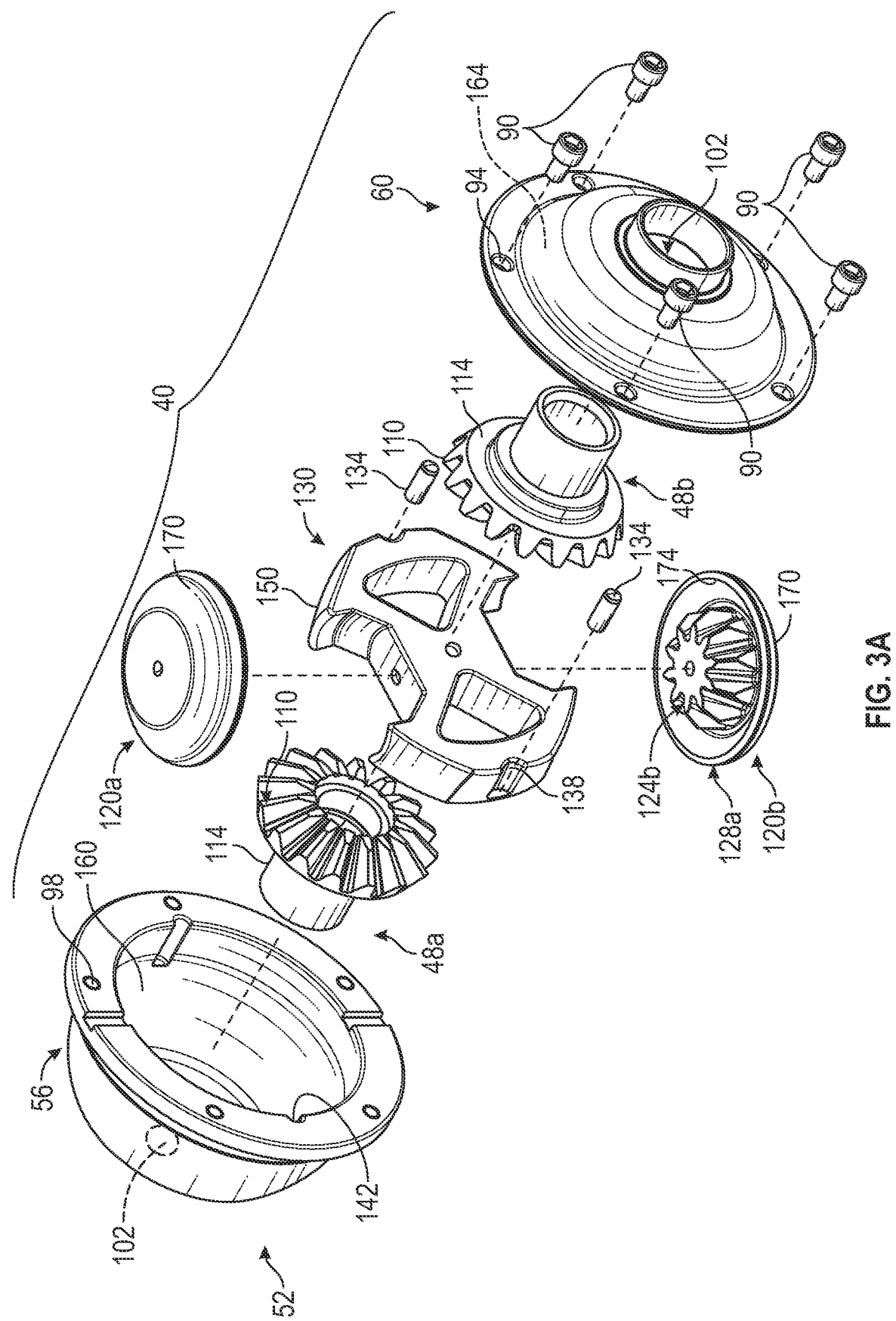
FIG. 3A is an exploded view of a differential assembly, according to various monuments.
Figure 3B:
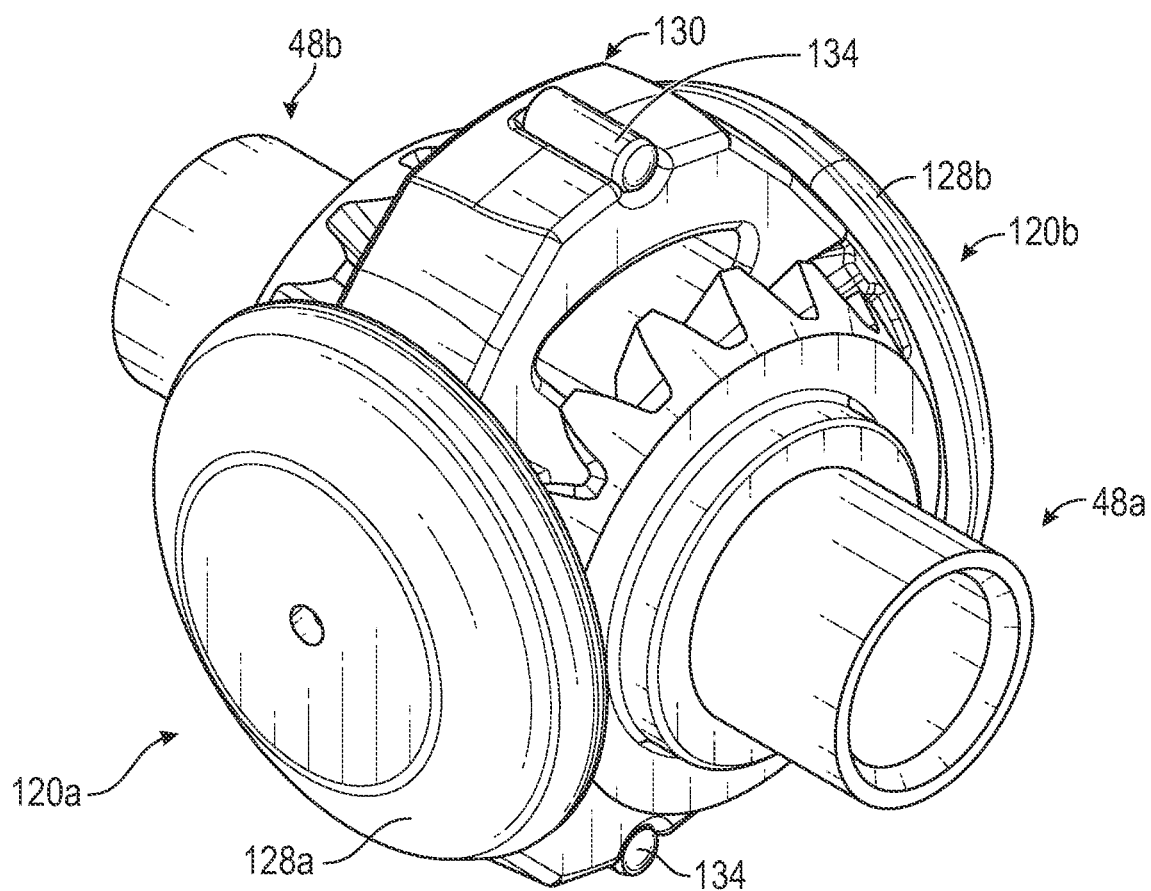
FIG. 3B is an assembled interior view of the differential assembly of FIG. 3A.

Turning reference to FIGS. 3A and 3B, the differential assembly 40 may include the housing portions 56, 60 which may be connected together with a plurality of fasteners, 90. The fasteners 90 may pass through bores formed in the housing portions 56, 60 and connect with secondary fasteners and/or be fit into threaded blind bores in the housing. For example, the fasteners 90 may pass through a first bore 94 in the housing portion 60 and engage a threaded blind bore 98 in the housing 56. It is understood, however, that the housing portions 56, 60 may be fit together in any appropriate manner.

The differential assembly 40 may include the axle or end gears 48*a*, 48*b*. The axle end gears 48*a*, 48*b* may be fit within the housing assembly 52 and/or include portions that extend therefrom to engage the respective axles 44*a*, 44*b*. In various embodiments, however, the housing portions 56, 60 may include axle bores, such as an axle bore 102 to which the respective axle portions 44 may pass. The axle portions may engage the axle end gears 48*a*, 48*b*.

The axle end gears 48*a*, 48*b* may include respective gear tooth portions 110 and back face portions 114. The tooth portions 110 may be defined as bevel gears or bevel teeth, as is generally understood by one skilled in the art. The bevel tooth design 110 may include selected dimensions, such as those that are provided on the axle end gears 48*a*, 48*b*.

The differential assembly 40 may further include one or more spider gears 120. In various embodiments, for example, as illustrated in FIGS. 3A and 3B, the differential assembly may include two spider gears 120*a*, 120*b*. Each of the spider gears 120*a*, 120*b* may include a gear face or portion 124 and a cap portion 128. The cap portion 128 may also be referred to as a clutch portion 128. The discussion of a single one of the gear portions 124 and cap portions 128, as discussed herein, will be understood to relate to all of the spider gears 120. Differentiating between the respective spider gears may be done with a lowercase 'a' or lowercase 'b' in the present discussion. Nevertheless, each of the spider gears may include a substantially identical portions, unless otherwise identified. Further, the differential assembly 40 may include two portions that relate to the different portions of the differential assembly, such as two of the axle end gears 48*a*, 48*b* and other appropriate portions as discussed further herein.

The differential assembly 40 may further include a locking member or portion 130. The locking member 130 may also be referred to as a cam member or portion 130. The locking member 130 may be engaged within the housing assembly, such as the first housing member 56 with one or more engagement or locking pins 134. The locking pins 134 may be engaged in a depression, such as an open or curved depression 138 formed in the locking member 130 and an open depressions 142 formed in the housing 56. The locking pins 134, therefore, may provide a keyed connection or interaction between the locking member 130 and the housing member 56. It is understood, however, that the keyed connection may include an integral portion, such as a projection form the locking member 130 and a depression in the housing portion 56, rather than a separate key portion.

As discussed further herein, the locking member 130 may be held relative to the housing member 56 and, therefore, within the differential assembly 40 for operatively locking the two axles 44a, 44b relative to one another to provide power to the respective wheels 12w', 12w" from the engine 24. The locking member 130 may further include an engaging surface or locking surface 150, as discussed further herein.

The differential assembly 40 may include various components that allow for transfer of power from the engine 24 to one or more of the wheels 12w. As discussed above, the differential assembly may include respective axle end gears to engage the respective axles, such as through the housing portions 56, 60. The spider gears 120 may be engaged or locked with the locking member 130 which is held relative to the housing assembly 52, such as the housing member 56 with the locking pins 134. Thus, the differential assembly 40 may transfer power from the engine 24, as discussed further herein. As also discussed herein, the differential assembly 40 may lock to ensure an equal transfer of power to each of the wheels 12w', 12w" via only one or mechanical connections and interactions as discussed herein.

Figure 4:
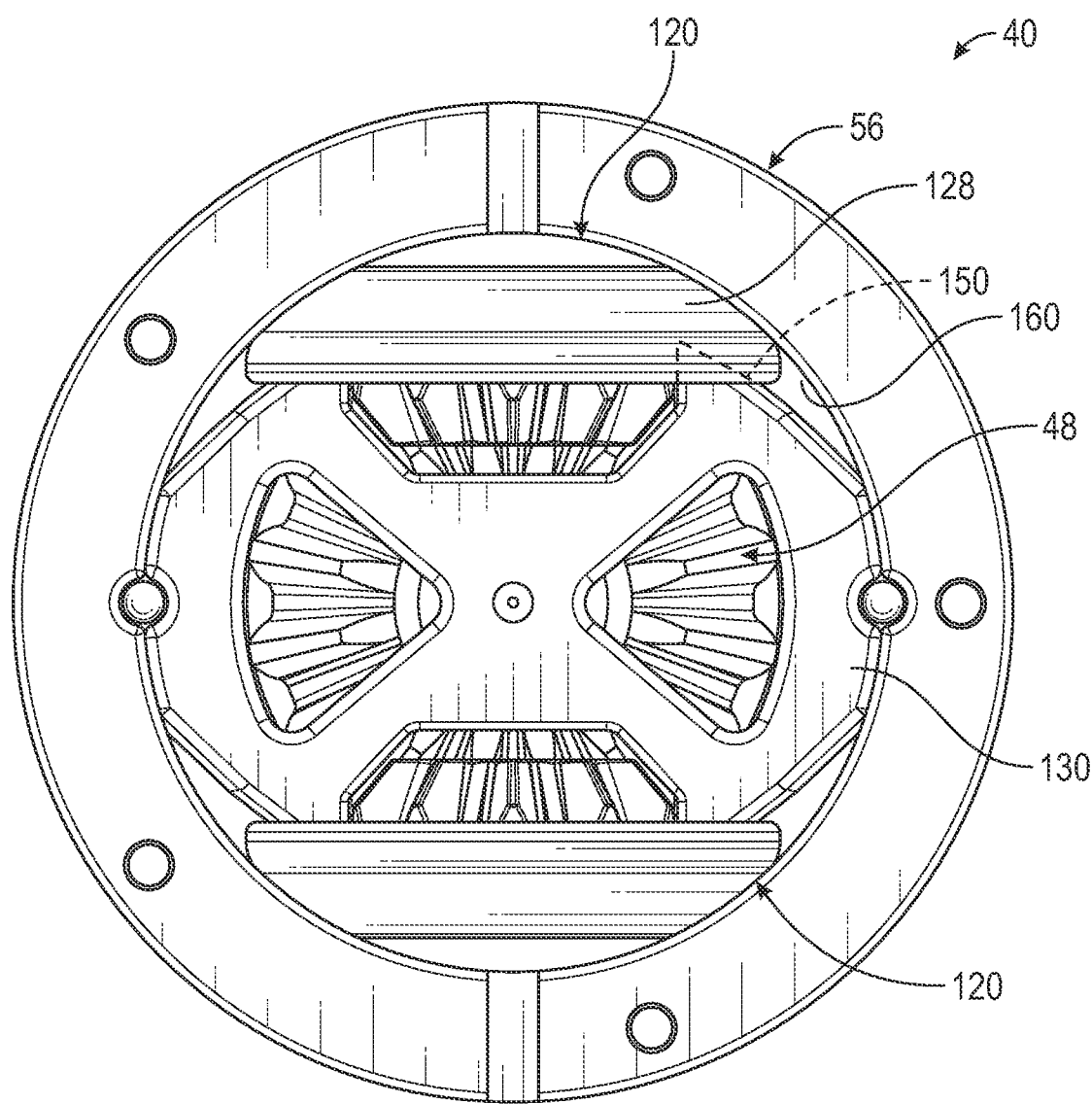
FIG. 4 is a partial interior view of the differential assembly of FIG. 3A.

With additional reference to FIG. 4, the housing assembly 56 may encompass a plurality of gear portions, including the spider gears 120 and the axle end gears 48. Further, the locking member 130 may be held relative to the housing assembly 56. The various portions, such as portions of the caps 128 and the second axle end gear 48 may be held within the or at least partially encompassed by the housing member 60. Nevertheless, the housing member 60 and the second axle end gear 48 are removed from FIG. 4 for clarity of the current discussion.

In the differential assembly 40, the spider gears 120 may be held within the housing member 56, such as within a cavity thereof. The cavity may be defined by an internal wall or surface 160 of the housing member 56 and an internal wall or surface 164 of the housing member 60. The internal surfaces 160, 164 that define the cavity allow for positioning of the components of the differential assembly relative to the housing assembly 52. As illustrated in FIG. 4, the locking member 48 includes the locking surface 150 that may engage a portion of the cap 128. In particular, the cap 128 may include an exterior surface 170 that may be held or engage the internal surface 160 of the housing member 56 and an interior surface 174 that also may be referred to as a cap locking surface 174. The cap locking surface 174 may engage the locking member locking surface 150, as discussed further herein. Further, the exterior surface 170 of the cap 128 may hold the spider gear 120 relative to the locking member 130 and to the axle end gears 48a, 48b. Thus, the spider gears 120 may be held in position within the differential assembly 40 without center pins or holding pins. As discussed above, the interior surface may be arcuate, including substantially spherical. The exterior surface 170 may also be arcuate and substantially match the curve or arc of the interior surface 160. In various embodiments, the housing member 56 may further include a portion of the interior surface 160 that is generally cylindrical, such as the portion that is adjacent or surrounds the locking member 130.

Figure 5:
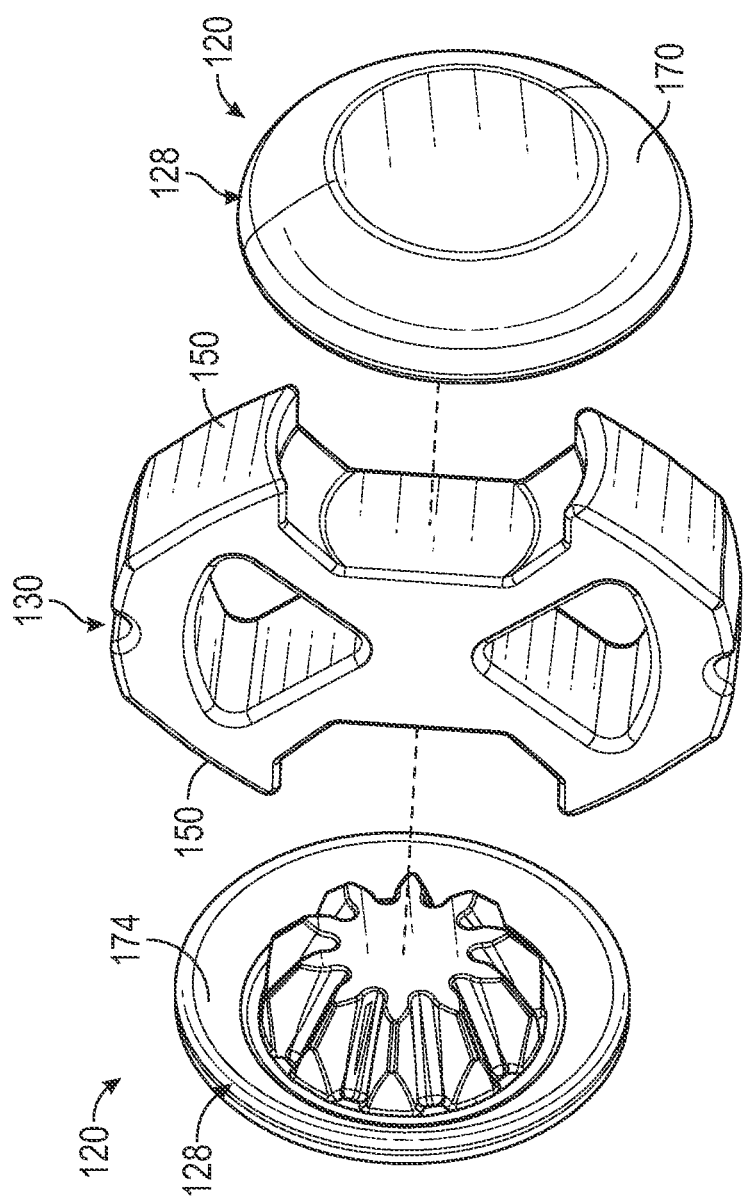
FIG. 5 is a partial exploded view of the differential assembly of FIG. 3A.

With continuing reference to FIGS. 1-4 and additional reference to FIGS. 5 and 6, the locking member 130 having the locking surface 150 may engage the cap locking surface 174 to lock the spider gears 120 to the case assembly 52, including the case member 56. The locking member 130 may wedge the spider gears between the locking member 130 and the internal surface 160 of the case member 56 to engage or lock the differential assembly 40. Thus, as discussed further herein, the differential may lock, such that the spider gears 120, and therefore, the axle end gears 48a, 48b do not rotate relative to the housing 52.

The spider gears 120 may each include an exterior or housing locking surface 170, as discussed above. The exterior surface 170 may engage against the interior surface 160 of the housing member 56 and/or the interior 164 of the housing member 60. When engaged, the spider gear 120 may be locked or engaged against the housing assembly 52 to lock the differential assembly 40. The locking member 130, such as at the locking surface 150 may further engage the internal surface 174 of the cap 128 of the spider gear 120. By engaging the spider gear 120, such as the exterior surface 170, against the internal surface 160, the spider gear 120 may be locked against the casing or housing assembly 52.

As discussed above, and further illustrated in FIG. 7, the spider gear 120 includes the bevel gear face or teeth 124 that engages the bevel teeth or face 110 of the shaft end gear 48. As the respective gear teeth portions 124, 110 are engaged and the exterior surface 170 is engaged against the housing surface 160, the spider gears 120 may be locked to the axles 44. Accordingly, the differential assembly 40 may be locked in the locked configuration when the exterior surface 170 of the cap portions 128 are locked or engaged against the internal surface 160. The cap 128 having the locking portions or surfaces may also be referred to as clutches to cause engagement and fixation to resist a relative movement under an applied or selected locking force. In other words, as illustrated in FIGS. 6 and 7, the spider gears 170 may be locked or have a clutch surface that engages the internal surface 160 of the housing assembly 56 and the tooth faces 124, 110 may also be engaged to transfer force directly to both of the axle portions 44 in a locked configuration of the differential assembly 40.

Figure 7:
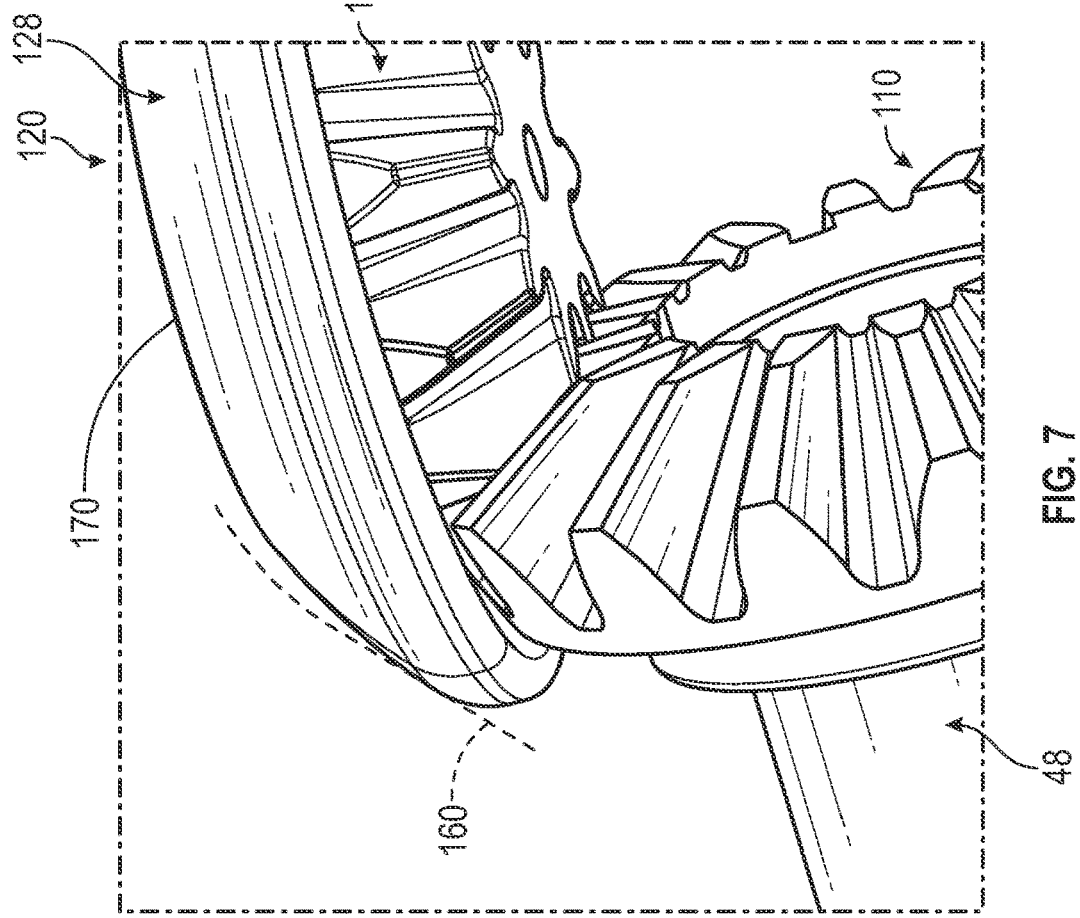
FIG. 7 is a partial detailed view of an interaction of a various portions of the differential assembly of FIG. 3A.

With continuing reference to FIGS. 6 and 7, the assembly including the exterior surface 170 of the spider gear 120 may engage the interior surface 160 of the housing 52. The interior surface 160 of the housing may be substantially spherical or define an exterior surface of a sphere when the housing 52 is assembled. Therefore, the curve or radius of the interior surface 160, according to various embodiments, may be substantially constant.

As discussed above, the spider gear 120 may engage or lock against the interior service 160 when the locking force is applied. The locking force may be applied when the locking member 130 engages the spider gear 120, such as the cap 128 thereof. The locking member 130 includes the surface 150 that may engage the surface 174 of the cap 128. As illustrated in FIG. 6, the locking surface 150 may extend along an axis or plane 200. The cap locking surface 174 of the cap 128 may extend along a surface or plane 204. Between the two planes or axes 200, 204 may be defined an angle 210. The angle 210 may form or be referred to as a compression angle 210.

The compression angle may be selected based upon various characteristics, such as having a low torque differential lock up and/or a greater torque differential lockup. Further, the angle may be selected based upon the ease of unlocking the engagement of the locking member 130 with the spider gear 120. In various embodiments, for example, the compression angle 210 may be about 0 degrees to about 20 degrees. In various embodiments, the angle 210 may be selected within a range of about 0.05 degrees)(° to about 1 degree from a specified limit. It is further understood, however, that the angle may be selected to be about 5 degrees, about 8 degrees, and/or about 20 degrees. Therefore, the angle range of the angle 210 may be about 3 degrees to about 8 degrees, including about 5 degrees.

As discussed above, therefore, the locking member 130 may engage the spider gear 120 during a differential of torque being applied to the differential assembly 40 between the two axles 44a, 44b. The greater the differential of torque applied the more likely the locking number 130 may lock with the spider gear 120 and lock the differential assembly 40. The lower the angle the lower the differential of torque applied may be necessary to lock the differential assembly 40. In other words, the lower the angle the easier to lock the differential assembly 40.

In various embodiments, the locking surfaces, such as the locking surface 150 of the locking member 130 and the locking surface 170 of the cap member 128 may define geometry to assist in ensuring or creating of the locking of the differential assembly 40. In various embodiments, the compression angle 210 may be constant. In various embodiments, however, the compression angle 210 may vary based upon a variable radius of either the locking surface 150 of the locking number 130 and/or the locking surface 174 of the spider gear 120.

Figure 8:
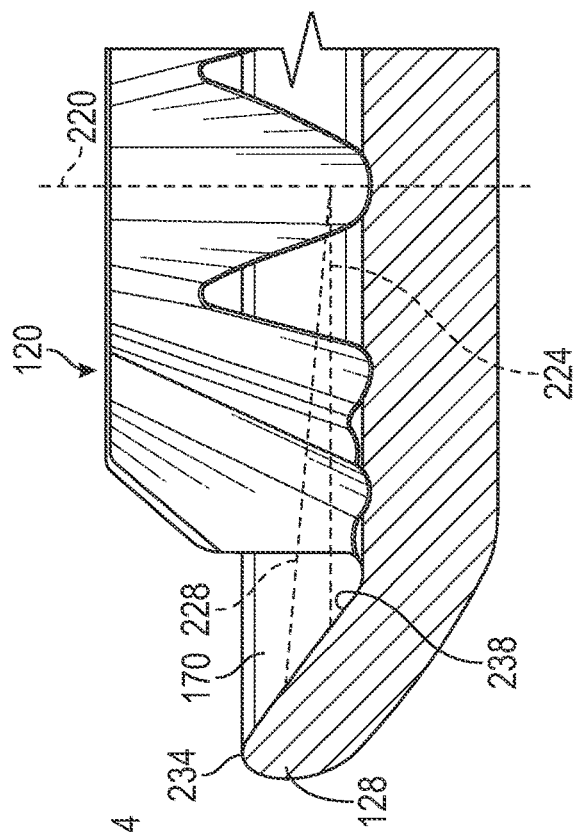
FIG. 8 is a detailed view of a spider gear of the differential assembly.
Figure 9:
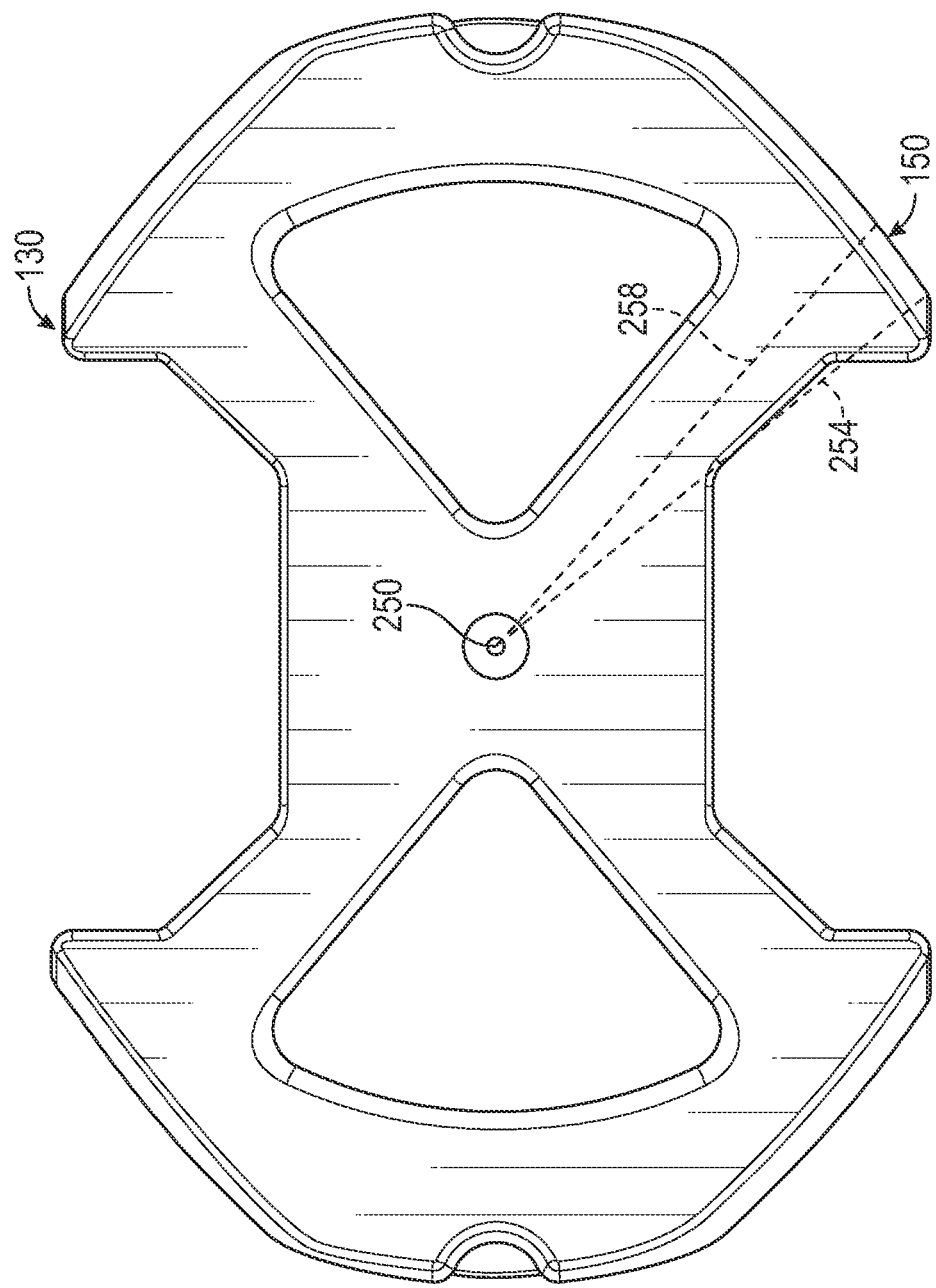
FIG. 9 is a detailed view of a cam or locking member of the differential assembly of FIG. 3A.

Turning reference to FIGS. 8 and 9, the spider gear 120 may have the locking surface 170 that is formed on an interior of the cap 128, as discussed above. The spider gear 120 may define or have a point 220 that may be positioned near a center of the spider gear 120. In various embodiments, the inner surface or locking surface 170 of the spider gear 120 may define a plurality of radii, such as a first radius 224 and a second radius 228, to the point or position 220. The first radius 224 may be smaller than the second radius 228. It is understood that the radius of the locking surface 170 may include any appropriate number of different radii and the exemplary two radii 224, 228 is merely exemplary. For example, the locking surface 170 of the spider gear 120 may have a continually changing radius and may be understood to define a plurality of radii. In various embodiments, a center of the radii, e.g., first radius 224 and a second radius 228, may be exterior to the spider gear 120.

As discussed above, the locking surface 170 of the spider gear generally engages a portion of the locking surface 150 of the locking member 130, as discussed above and illustrated in FIG. 8. Accordingly, the locking surface 150 may also have a varying radius that is formed between a rim or edge 234 in an intermediate region or portion, such as an intermediate portion 238 of the locking surface 170. The variable radius of the locking surface 170 may define or form a varying compression angle 210. In this way, the compression angle 210 may not be substantially constant over the entire surface of the locking surface 170 of the spider gear 120. The variable radius, at least in part, provides the variable or changeable compression angle 210 and may allow for the differential assembly 40 to engage or lock at a selected torque bias and unlock at a selected torque bias, such as at a low torque bias relative to a high torque bias to allow for efficient engagement of the locking differential and unlocking thereof.

Further the locking member 130, as illustrated in FIG. 9, may also have a center axis or point 250. The locking surface 150 may also include a variable radius such as a first radius 254 and a second radius 258. It is understood that the radius of the locking surface 150 may include any appropriate number of different radii and the exemplary two radii 254, 258 is merely exemplary. Further, the changing (also referred to as varying) radius of the locking surface 150 may also change the compression angle 210 relative to the locking surface 170 and the interior surface 160 of the differential assembly 40.

Accordingly, the spider gear 120 and the locking member 130 may both include or separately include a variable radius of the respective locking surfaces 170, 150. Thus, the compression angle 210 may vary based upon a position of the locking member 130 relative to the spider gear 120 and allow for a selected locking and unlocking of the differential assembly 40. Further, the variable radius may be defined in a plurality of manners, such as by varying the radius as discussed above and/or in a selected manner such as defined as an involute curve relative to the respective locking surfaces 150, 170. The position of the locking member 130 relative to the spider gear 120 may be oriented to define the varying angle 210. An elastic deflection of the housing 56 may also affect the locking effect, such as the toque differential required to lock the differential assembly 40. Therefore, the locking effect is also affected by the torque input to the locking member (also referred to as cam) 130 by the housing 56 and ultimately the ring gear 64. Thus, the differential assembly 40 may also be referred to as a torque sensing differential assembly 40.

The variable radius and the resulting variable compression angle allow the compression angle to change depending upon the relative position of the two locking surfaces. For example, as the locking member 130 and the spider gear 120 move closer together, the compression angle may decrease. The variable compression angle may allow for the differential assembly 40 to lock and unlock at different torque biases and even negative torque bias of the different wheels.

Figure 10:
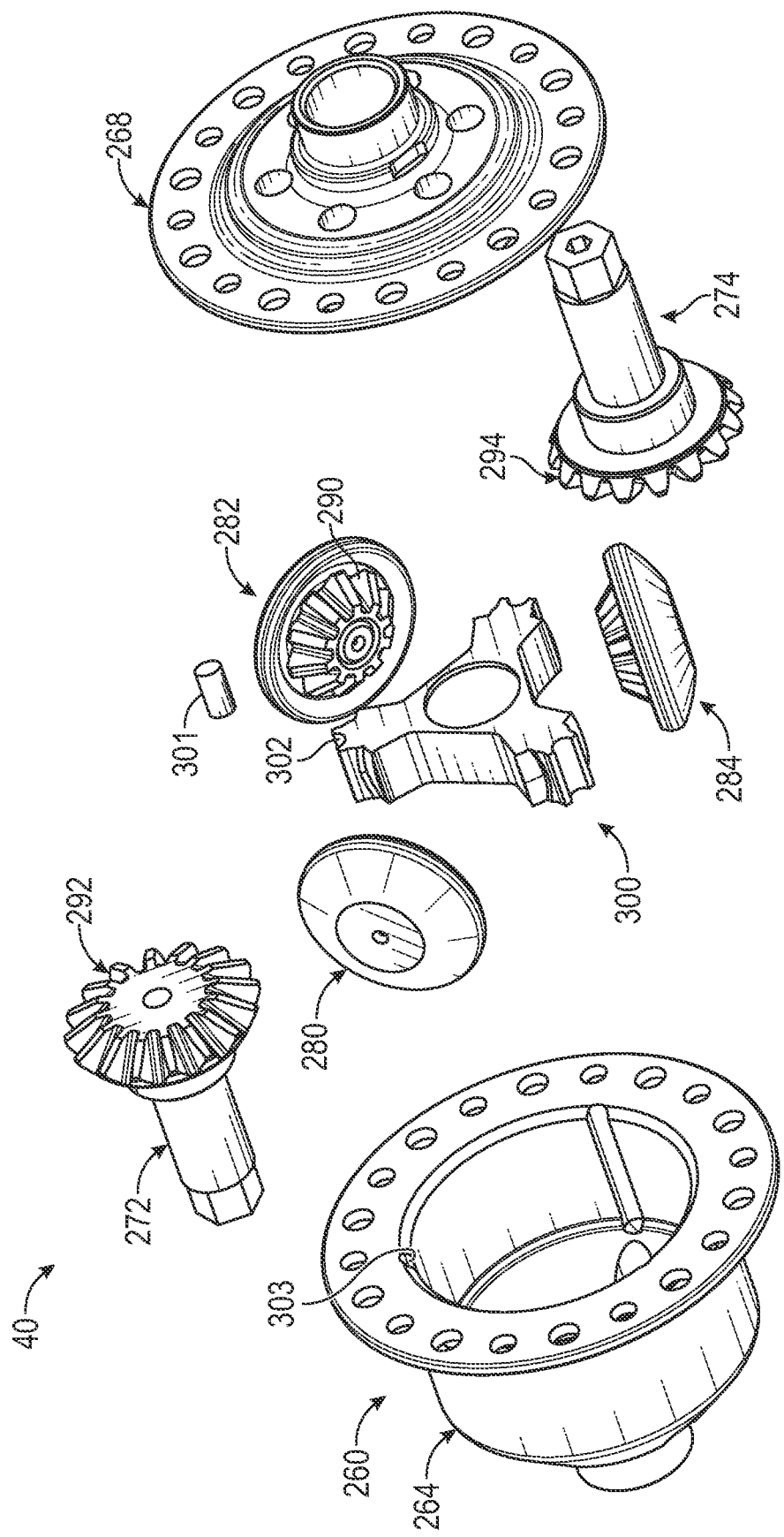
FIG. 10 is an exploded view of a differential assembly, according to various embodiments.
Figure 11:
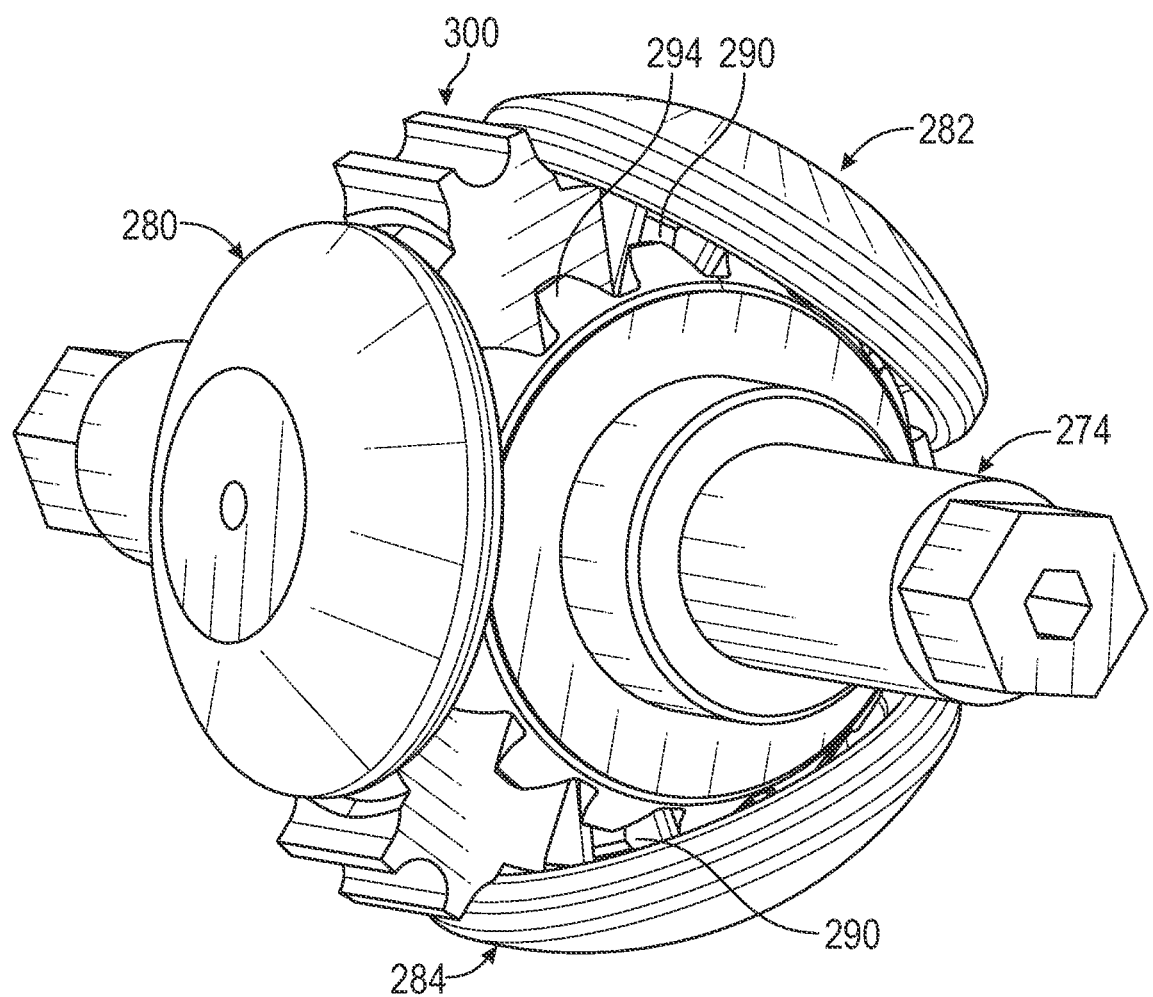
FIG. 11 is an interior view of a gear assembly of the differential assembly of FIG. 10.

According to various embodiments, with initial reference to FIG. 10 and FIG. 11, a differential assembly 40' is illustrated. The differential assembly 40' may be similar to the differential assembly 40 discussed above, and the similar or identical portions will not be repeated in detail here. Nevertheless, the differential 40' may include various features that may differ from and/or be incorporated into the differential assembly 40 discussed above and/or alternatives there too.

For example, the differential assembly 40' may include a housing assembly 260. The housing assembly 260 may include a first housing portion 264 that may also be referred to as a bell housing. The housing 260 may further include a second housing member 268 that may be substantially flat or planar relative to the first housing portion 264. Assembled within the housing assembly 260 may be a plurality of members or portions including two axle or side gears, including a first side gear 272 and a second side gear 274. The two side gears may be substantially similar to the side gears 48a and 48b, as discussed above. The side gears 272, 274, however, may include dimensions, such as based upon the geometry of the housing assembly 260. Further the differential assembly 40' may include a plurality of spider gears, such as a first spider gear 280, a second spider gear 282, and a third spider gear 284. The three spider gears 280-284 may, again, be similar to the spider gears 120, as discussed above, but include a different size and/or number in the differential assembly 40' relative to the differential assembly 40 as discussed above. As illustrated in FIG. 10, the differential assembly 40' may include the spider gears 280-284 and a locking member 300.

As illustrated here, for example, the spider gears 280-284 may include three spider gears that may mesh with the axle gears 272, 274. Generally, each of the spider gears 280-284 may include a plurality of teeth 290 that engage with both of the side gears 272, 274 at side gear teeth 292, 294, respectively. As discussed above the differential assembly 40' may be assembled into the vehicle 12 as also discussed above. Axles of the vehicle 12 may engage the axle gears and 272, 274 in a substantially similar manner. The teeth 294, 292 of the side gears is 272, 274 may engage the teeth 290 of the respective spider gears 280-284. During an unlock configuration of the differential assembly 40', therefore, the wheels of the vehicle 12 may rotate at varying speeds relative to one another due to the differential assembly 40'.

Figure 12:
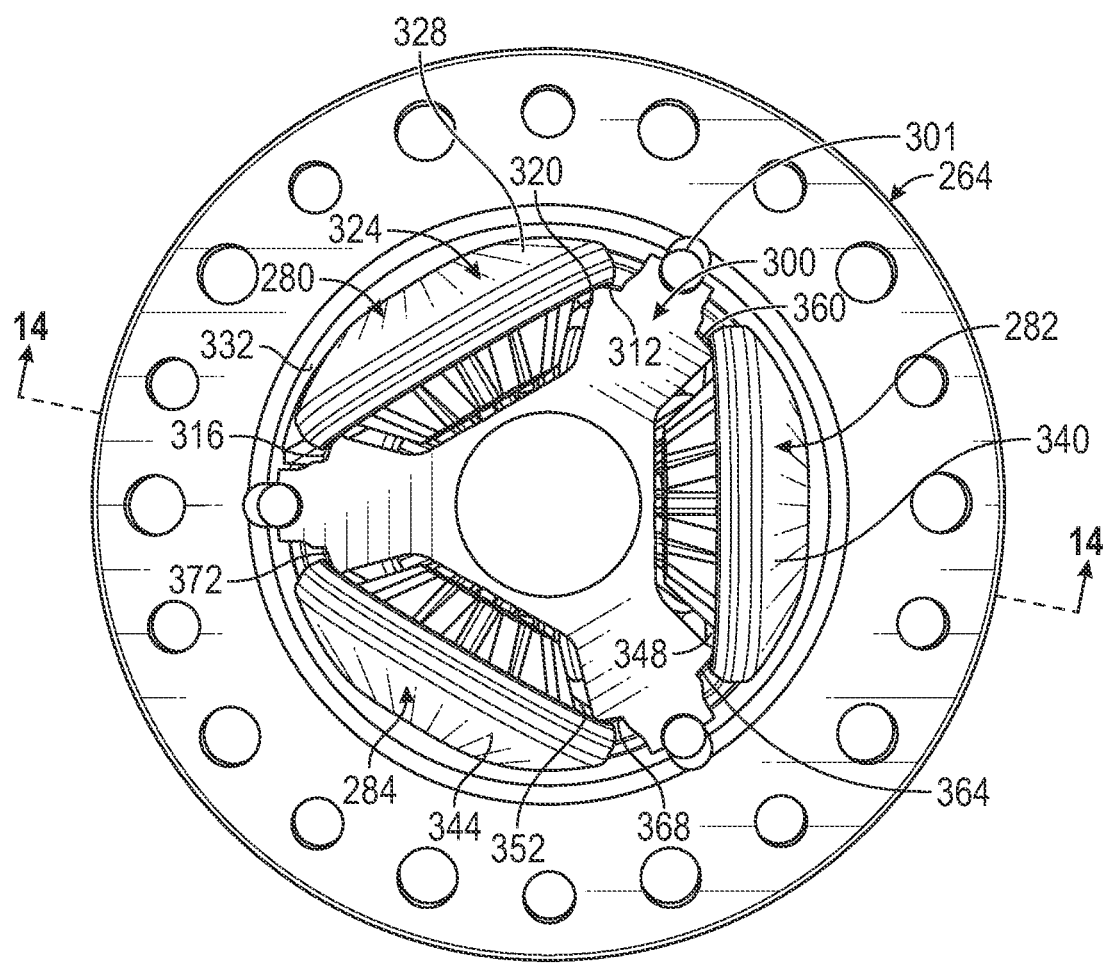
FIG. 12 is a partial interior view of the differential assembly of FIG. 10.
Figure 13:
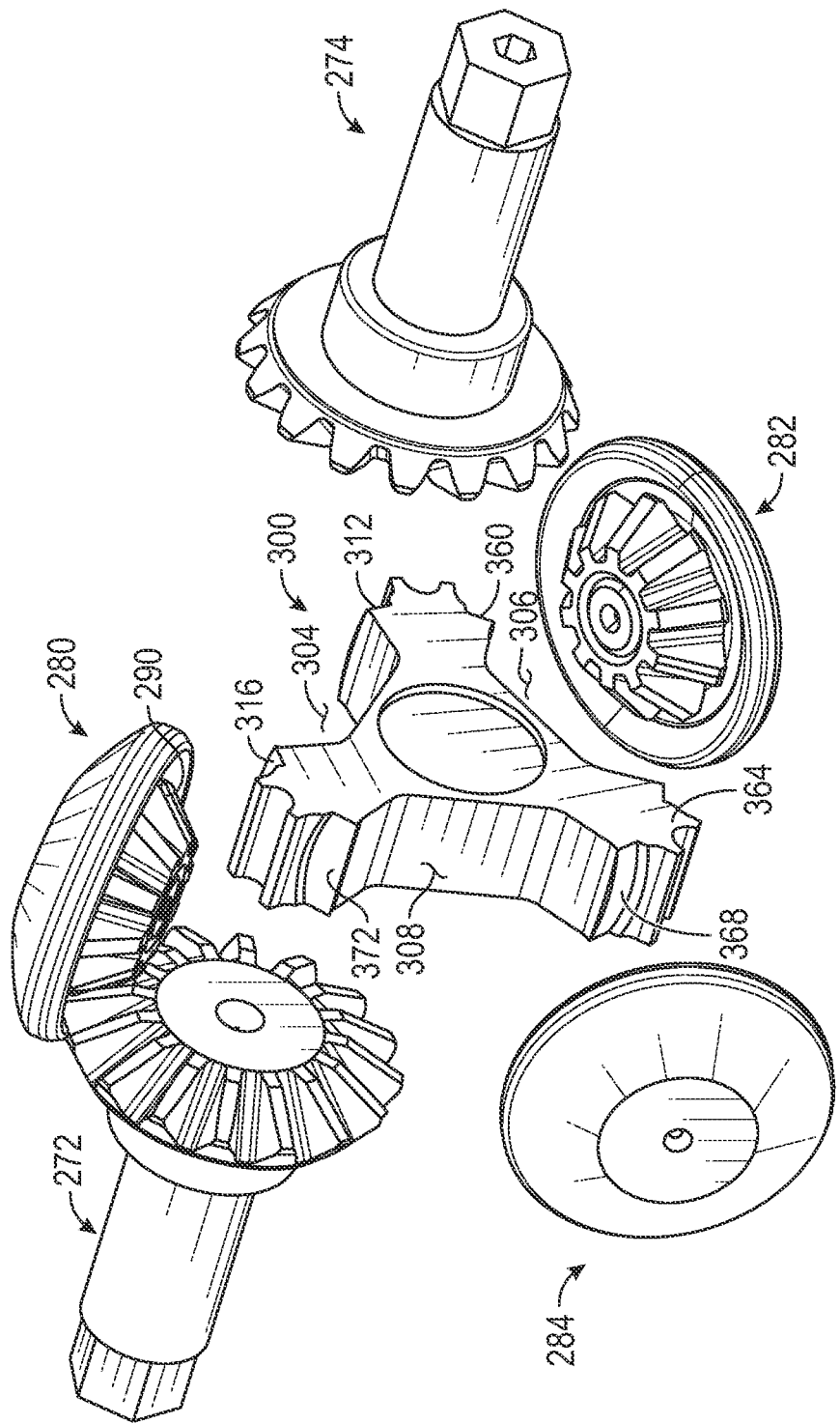
FIG. 13 is an exploded view of an interior assembly of the differential assembly of FIG. 10.

With continuing reference to FIGS. 10 and 11, and additional reference to FIGS. 12 and 13, the internal gearing of the differential assembly 40' is illustrated. The locking member 300 may include voids 304, 306, and 308 to receive the tooth portions 290 of the spider gears 280-284. The locking member 300 may further include a plurality of locking surfaces that are adjacent to or defined at least near a portion of the respective voids 304-308. For example, the locking member 300 may define or include a first and second locking surface 312, 316 that engages a locking surface 320 defined as an interior surface of a cap or cover 324 of the spider gear 280. The cap 234 may further define an exterior surface 328 that may engage an interior surface 332 of the housing, such the housing member 264. The locking member 300, therefore, may engage the locking surface 320 of the spider gear 280 in a manner similar to that discussed above to lock or fix the spider gear 280 relative to the housing 264. The locking member 300 is fixed relative to the housing 264 by a key or fixation portion, such as one or more pins or locking portion 301 similar to the pins 134 discussed above. The pins 301 may be received between a first groove 302 in a locking member and a second groove 303 in the housing 264. As discussed above, the locking member 300 and/or the housing 260 may have integral portions rather than separate portions to key and fix the locking member 300 relative to eh housing 260. Accordingly when the locking member 300 is locked against the spider gear 280-284 the differential assembly 40' may be locked as a unit to ensure an equal speed between two wheels, such as the wheels 12w' and 12w''' similar to that as discussed above. Moreover, the locking member 300 may lock each of the spider gears 280, 282, 284 relative to the housing 260.

Each of the spider gears may include a respective cap, such as the cap 340 of the spider gear 282 in the cap 344 of the spider gear 284. Each of the caps 340, 344 include a respective interior or locking surface 348, 352. Further the locking member 300 may include respective locking surfaces for each of the spider gear locking surfaces 348, 352. For example, the locking member 300 may include a third locking surface 360 and a fourth locking service 364 to engage the interior surface 348 of the spider gear 282. Further, the locking member 300 may include a fifth locking surface 368 and a sixth locking surface 372 to engage the interior surface 352 of the spider gear 284. Thus, the locking member 300 may engage each of the spider gears 280-284 with the respective locking surfaces 312-372. The locking surfaces of the locking member 300 may engage the locking surfaces of the respective spider gears 280-284 in a manner similar to the locking member discussed above.

With continuing reference to FIGS. 10-12 and additional reference to FIG. 13, the respective locking surfaces and the interior surface 332 of the housing 264 is discussed in greater detail. The respective spider gears 280-284 may include geometries that are substantially similar, accordingly a discussion herein of the spider gear 280 is merely exemplary. Further, respective locking surfaces may also include substantially similar geometries as discussed herein. Therefore, exemplary reference to the spider gear 280 and the interior surface 320, also be referred to as the locking surface, may engage or be engaged by the respective locking surfaces 312, 316 of the locking member 300. As the locking surfaces engage each other, the locking member 300 may engage and lock the spider gear relative to the interior surface 332 of the housing to lock or engage the differential assembly 40'.

Figure 14:
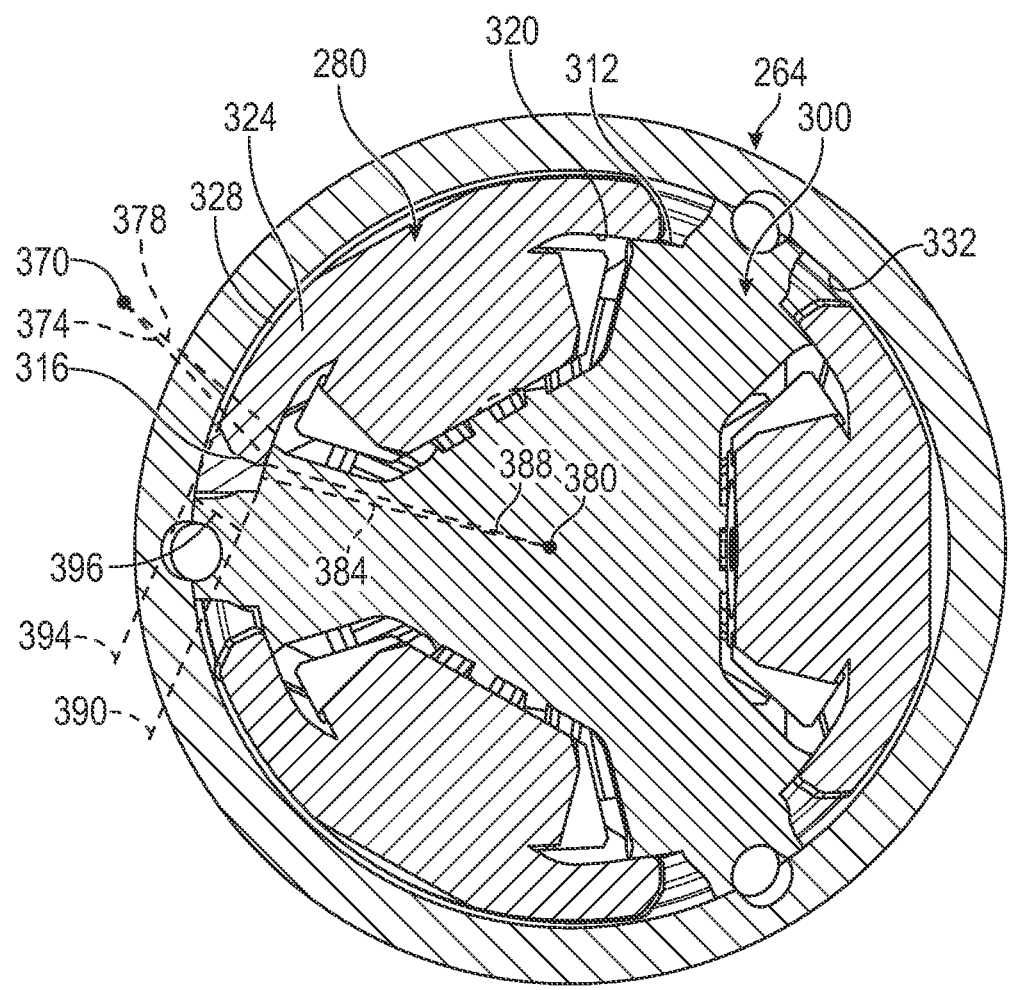
FIG. 14 is a cross-sectional view of the differential assembly of FIG. 10 taken along lines 14-14 of FIG. 12.

With further reference to FIG. 14, the locking surface 320 of the spider gear 280 may have a variable or changing radius relative to a point 370. For example, the locking surface 320 may include a first radius 374 and a second radius 378. The two radii may differ relative to the point 370 and allow the locking service 320 to have a variable angle relative to the locking surface 312. Further, the locking surfaces of the locking member 300, such as the locking surface 312 and the locking surface 316 may also have selected radii that may be equivalent or similar to the radii 374, 378. The locking member 300 may include a center 380 and the locking surface 316 may include a first radius 384 and a second radius 388. It is understood that each of the locking surfaces of the locking member 300 may include the similar radii of the locking surfaces and/or include a plurality (e.g., any appropriate number of two or more) of radii. Further, the variable radii of the locking surface 320 of the spider gear 280 and the locking surfaces of the locking member 300 may be defined as an involute curve, as discussed above, and include a generally constantly changing radius.

The respective locking surfaces and the respective variable radii allow for the creation of a pressure angle 396 relative to the inner surface 332 of the housing between the respective locking surfaces, such as the locking surface 316 and locking surface 320, generally along or defined relative to a line or plane 390 and the exterior surface 328 of the cap 324 that may join along the line or plane 394. The angle 396 may be substantially similar or identical to the angle of the pressure angle, such as the angle 210 discussed above. In various embodiments, for example, the angle 396 may be about 0 degrees to about 20 degrees. In various embodiments, the angle may be achieved due to the engagement of the respective locking surfaces due to the respective locking surfaces of the differential assembly 40. Further, the various angles may be selected and included in the differential assembly based upon differing torque biases and/or driving characteristics attempted to be achieved by the differential assembly 40'.

In various embodiments, the differential assembly 40' may include three of the spider gears, such as the spider gears 280-284. The number of spider gears may be provided for various purposes such as distributing forces over a greater number of components, surface area, and the like within the differential assembly 40' relative to the differential assembly 40. Nevertheless, the differential assembly 40' may be allowed to create the locking configuration similar to the differential assembly 40 as discussed above. In various embodiments, the differential assembly 40' may be able to lock and unlock in only a mechanical manner including the portions discussed herein.

The differential assembly may further include a selected interior shape of the surface 332 of the housing 260. The interior may include a plurality of shapes and/or a single shape. For example, the housing portion 264 may include a cylindrical interior shape to generally housing the locking member 300 and a portion of the spider gears. Further, the interior surface 332 may define a dome to house and contact the caps of the spider gears. Thus, the differential assembly 40' may include a variable shaped interior.

Figure 15:
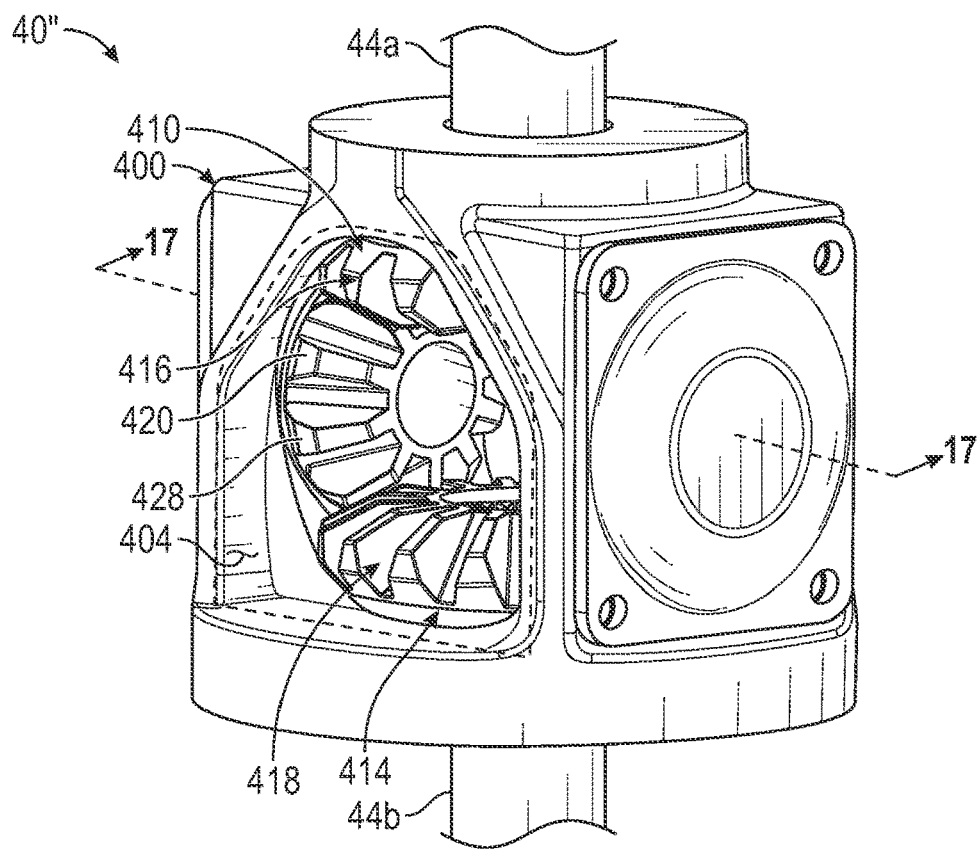
FIG. 15 is a differential assembly, according to various embodiments.
Figure 16:
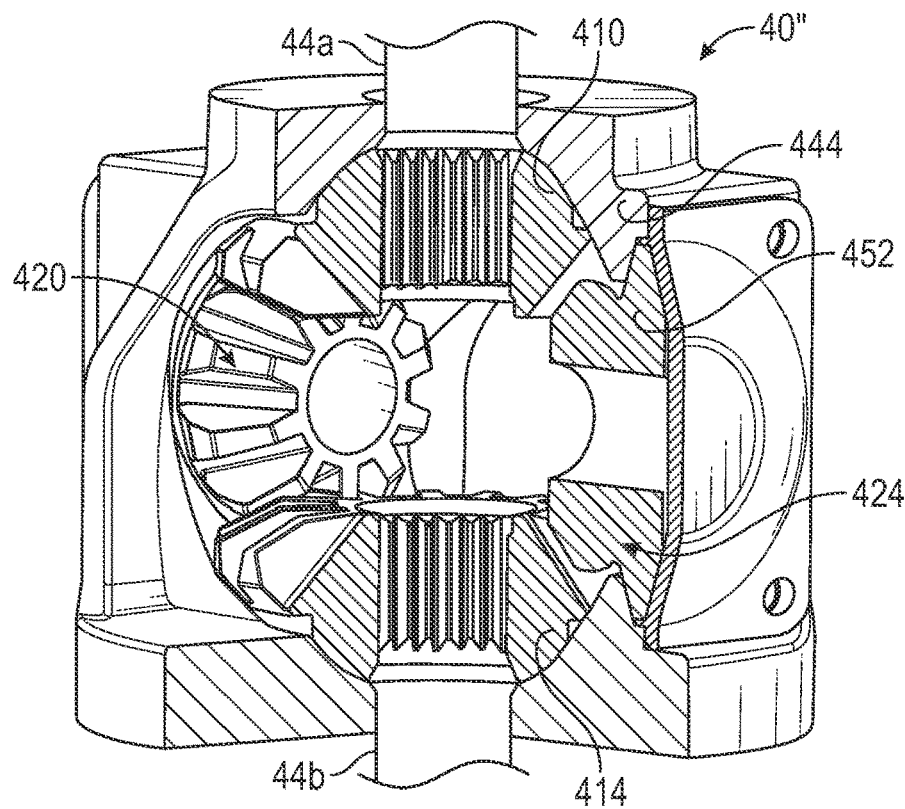
FIG. 16 is a partial cross-sectional view of the differential assembly of FIG. 15.

Turning reference to FIG. 15, a differential assembly 40" is illustrated. The differential assembly 40" may include portions that are similar to that as discussed above, additional portions and/or alternatives to differential assemblies as discussed above. Accordingly, substantially identical or similar pieces will not be described in repeated detail, but is understood that various portions may be augmented and/or provide in alternative in each of the various embodiments.

Generally the differential assembly 40" may include a housing 400 that may include various passages or openings, such as an opening 404 that may also be covered after assembly. The differential assembly 40" may further include access for the axles 44a, 44b to access the differential assembly 40" and one or more side or axle gears 410 and 414, respectively. Each of the axle gears include a plurality of teeth 416, 418, respectively. Held relative to the axle gears 414, 410 are pinion or spider gears 420 and 424. Each of the spider gears also include a plurality of teeth 428, 430, respectively.

Figure 17:
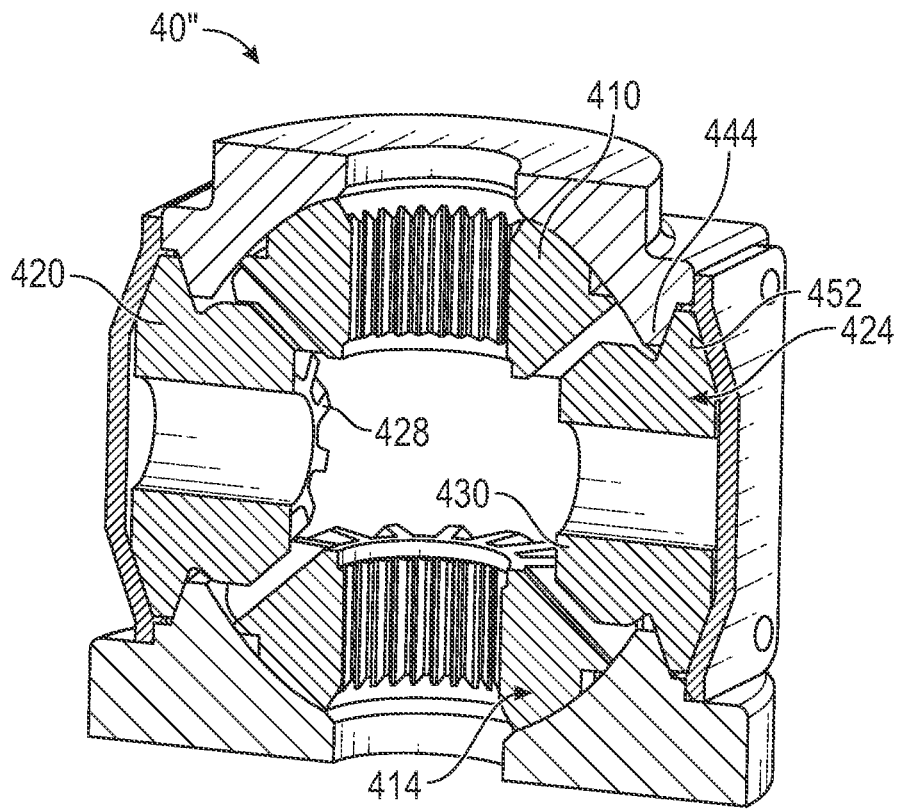
FIG. 17 is a cross-sectional view of the differential assembly of FIG. 15 taken along line 17-17.
Figure 18:
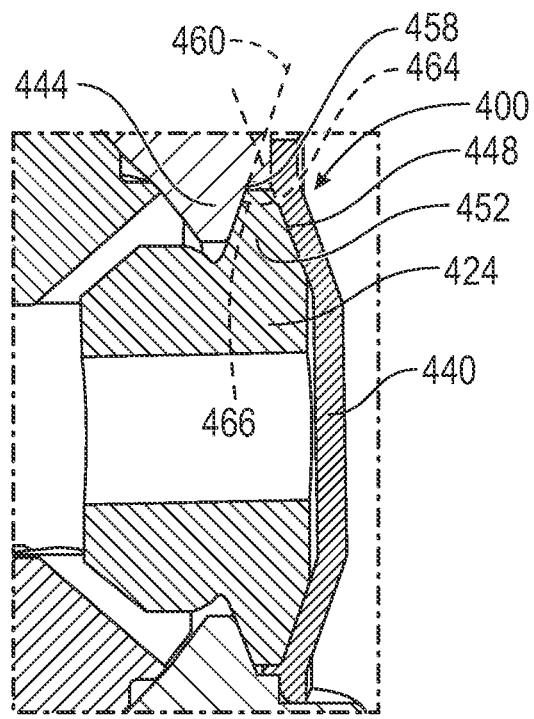
FIG. 18 is a detailed view of a spider gear and the housing of the differential assembly of FIG. 15.

The differential assembly 40" may operate in manner similar to that discussed above, but not including a separate cam or locking member that is positioned within the center of the differential assembly 40". As illustrated in FIGS. 17 and 18 the spider gear 424 may be held within it the housing 400 by a wall or exterior member 440. The housing assembly 400 may further include a clutch or locking member or portion 444. The spider gear 424 and 420 may both further include a locking surface or interior surface 448 that is formed or defined by a cap or top 452, such as that discussed above.

The clutch or locking portion 444 may form or define a locking surface 458 that may engage the surface 448 of the spider gear 424. As discussed above, the locking surface 458 of the locking member 444 may extend or have a locking portion that extends along a surface or plane 460. The interior surface 448 of the spider gear 424 may also extend along a surface or plane 464. Between the two surfaces 460, 464 may be a compression angle 466. The angle 466 may be any appropriate angle, such as discussed above including about 0 to about 20 degrees, and may form or define a pressure angle as discussed above in any appropriate range.

The two surfaces, such as the locking surface 458 and the interior locking surface 448 may also have a variable radius, as also discussed above, to provide for a variable angle 466 between the two surfaces. Nevertheless, during operation the locking differential assembly 40" may operate to lock the pinion gear to the outer housing portion 440 removing or forcing the locking portion 452 between a locking surface of the locking portion 444 and the housing portion 440. Thus, the differential assembly 40" need not operate with a separate locking member positioned within the differential assembly to allow locking of the differential assembly 40". Moreover, the pinion gears or spider gears 420, 424 may generally lock relative to the housing 400 to lock a differential to allow transmission of an equal speed to both of the axles 44a, 44b.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mechanical differential assembly, comprising:
   a spider gear operable to both rotate relative to a surface of a housing and be fixed relative to the surface of the housing;
   a clutch portion fixed to the spider gear, wherein the clutch portion and the spider gear are formed as one member; and
   a locking member;
   wherein the locking member is configured to engage the clutch portion, and wherein the clutch portion is configured to contact the surface of the housing to lock the spider gear to the housing when the mechanical differential assembly is in a locked configuration.

2. A mechanical differential assembly, comprising:
   a spider gear operable to both rotate relative to a surface of a housing and be fixed relative to the surface of the housing;
   a clutch portion fixed to the spider gear; and
   a locking member;
   wherein the locking member is configured to engage the clutch portion and lock the spider gear to the housing when the mechanical differential assembly is in a locked configuration;

wherein the clutch portion is a cap extending a distance from a toothed portion of the spider gear;
wherein the cap includes a cap interior surface that is configured to be engaged by the locking member.

3. The mechanical differential assembly of claim 2, further comprising: the housing to at least partially house the spider gear, the clutch portion, and the locking member; wherein at least one of the clutch portion or the locking member engage the surface of the housing, wherein the surface is an interior surface of the housing, in the locked configuration.

4. The mechanical differential assembly of claim 3, wherein the surface of the housing engages a locking surface of the locking member; wherein at least the locking surface of the locking member defines a changing radius.

5. The mechanical differential assembly of claim 4, wherein the surface of the housing defines a constant radius.

6. The mechanical differential assembly of claim 4, wherein the cap extends the distance radially from the toothed portion of the spider gear; wherein the locking surface of the locking member engages the cap interior surface.

7. The mechanical differential assembly of claim 6, wherein the cap and the toothed portion are formed as one member.

8. The mechanical differential assembly of claim 7, wherein a defined compression angle decreases as the locking member moves closer to the spider gear.

9. The mechanical differential assembly of claim 2, wherein the clutch portion and the spider gear are formed as one member.

10. A mechanical differential assembly, comprising:
a housing having an interior surface;
a spider gear having a toothed portion and a clutch portion fixed to the spider gear and extending from the toothed portion, wherein the spider gear is operable to both rotate relative to the interior surface of the housing and be fixed relative to the interior surface of the housing, wherein the clutch portion includes an interior clutch surface and an exterior clutch surface; and
a cam surface configured to engage the interior clutch surface and lock the spider gear to the interior surface of the housing when the mechanical differential assembly is in a locked configuration such that the exterior clutch surface engages the interior surface of the housing;
wherein a pressure angle is defined between the cam surface and the interior clutch surface.

11. The mechanical differential assembly of claim 10, further comprising:
a locking member having the cam surface.

12. The mechanical differential assembly of claim 11, wherein the interior surface includes at least one curved portion;
wherein the at least one curved portion defines a constant radius;
wherein the cam surface defines a changing radius.

13. The mechanical differential assembly of claim 12, wherein the cam surface is configured to move relative to at least one of the interior clutch surface or the interior surface.

14. The mechanical differential assembly of claim 10, wherein the clutch portion extends radially from the toothed portion.

15. A method of providing a mechanical differential assembly, comprising:
providing a spider gear having a toothed portion and a clutch portion fixed to the spider gear and extending from the toothed portion, wherein the spider gear is operable to both rotate relative to an interior surface of a housing and be fixed relative to the interior surface of the housing, wherein the clutch portion includes an interior clutch surface and an exterior clutch surface;
providing a cam surface configured to engage the interior clutch surface and lock the spider gear to the housing when the mechanical differential assembly is in a locked configuration such that the exterior clutch surface engages the interior surface of the housing; and
providing a pressure angle between the cam surface and the interior clutch surface.

16. The method of claim 15, further comprising:
forming the cam surface with a locking member; and moveably positioning the locking member relative to the interior surface.

17. The method of claim 16, further comprising:
providing the housing; and positioning the locking member and the spider gear within the housing.

18. The method of claim 15, further comprising:
forming the toothed portion and the clutch portion of the spider gear as a single member; and forming the clutch portion to extend radially from the toothed portion.

19. The method of claim 15, further comprising:
providing the interior clutch surface to define a changing angle relative to the cam surface such that the interior clutch surface causes a reduction of the pressure angle as the clutch portion and the cam surface move closer together.

20. The method of claim 19, further comprising:
positioning a locking member defining the cam surface moveably relative to the spider gear; and
providing at least one of the locking member or the spider gear to move based on a movement of an axle gear.

* * * * *